US012322796B2

(12) United States Patent
Lan

(10) Patent No.: US 12,322,796 B2
(45) Date of Patent: Jun. 3, 2025

(54) METHOD OF MANUFACTURING ANODE ACTIVE MATERIAL

(71) Applicant: Blue star advanced materials Co., Ltd., New Taipei (TW)

(72) Inventor: Chung-Wen Lan, Taipei (TW)

(73) Assignee: Blue star advanced materials Co., Ltd., New Taipei (TW)

( * ) Notice: Subject to any disclaimer, the term of this patent is extended or adjusted under 35 U.S.C. 154(b) by 104 days.

(21) Appl. No.: 18/485,945

(22) Filed: Oct. 12, 2023

(65) Prior Publication Data

US 2024/0128446 A1   Apr. 18, 2024

(30) Foreign Application Priority Data

Oct. 14, 2022   (TW) .................................. 111139067

(51) Int. Cl.
| | |
|---|---|
| *H01M 4/48* | (2010.01) |
| *C01B 33/18* | (2006.01) |
| *H01M 4/02* | (2006.01) |
| *H01M 4/36* | (2006.01) |
| *H01M 4/38* | (2006.01) |
| *H01M 4/583* | (2010.01) |

(52) U.S. Cl.
CPC ............ *H01M 4/48* (2013.01); *C01B 33/181* (2013.01); *H01M 4/366* (2013.01); *H01M 4/381* (2013.01); *H01M 4/382* (2013.01); *H01M 4/583* (2013.01); *C01P 2004/80* (2013.01); *C01P 2006/40* (2013.01); *H01M 2004/027* (2013.01)

(58) Field of Classification Search
CPC ........... H01M 4/405; H01M 2004/027; H01M 4/386; H01M 4/1395; C01B 33/181
See application file for complete search history.

(56) References Cited

PUBLICATIONS

Alaboina et al, Mechanically prelithiated silicon nano alloy as highly engineered anode material, Electrochimica Acta 258 (2017) 623-630.*
Huang et al, Progress and challenges of prelithiation technologyfor lithium-ion battery, Carbon Energy. 2022; 4: 1107-1132.*
Casimir A, Zhang H, Ogoke O, Amine JC, Lu J, Wu G., "Silicon-based anodes for lithium-ion batteries: Effectiveness of materials synthesis and electrode preparation", Nano Energy. 2016;27:359-376.
Li Z, He Q, He L, Hu P, Li W, Yan H, et al., "Self-sacrificed synthesis of carbon-coated SiOx nanowires for high capacity lithium ion battery anodes", Journal of Materials Chemistry A. 2017;5:4183-4189.
Parimalam BS, Mac Intosh AD, Kadam R, Lucht BL, "Decomposition reactions of anode solid electrolyte interphase (SEI) components with LiPF6" The Journal of Physical Chemistry C. 2017;121:22733-22738.

\* cited by examiner

*Primary Examiner* — Alex A Rolland
(74) *Attorney, Agent, or Firm* — MUNCY, GEISSLER, OLDS & LOWE. P.C.

(57) ABSTRACT

A method of manufacturing an anode active material is to dope a plurality of anode material particles with alkali metal by use of molten alkali metal to obtain a plurality of alkali-metal-containing anode material particles. The method of the invention is also to perform a homogenization process and a passivation process on the alkali metal-containing anode material particles to obtain a plurality of passivated and homogenized alkali-metal-containing anode material particles serving as the anode active material.

4 Claims, 10 Drawing Sheets

METHOD OF MANUFACTURING ANODE ACTIVE MATERIAL

CROSS-REFERENCE TO RELATED APPLICATION

This utility application claims priority to Taiwan Application Serial Number 111139067, filed Oct. 14, 2022, which is incorporated herein by reference.

BACKGROUND OF THE INVENTION

1. Field of the Invention

The invention relates to a method of manufacturing an anode active material, and more in particular, to a method of manufacturing a plurality of passivated and homogenized anode material particles doped with alkali metal, which serve as an anode active material.

Regarding the relevant technical background of this present invention, please refer to the references listed below:
[1] Casimir A, Zhang H, Ogoke O, Amine J C, Lu J, Wu G., "Silicon-based anodes for lithium-ion batteries: Effectiveness of materials synthesis and electrode preparation", Nano Energy. 2016; 27:359-376.
[2] Li Z, He Q, He L, Hu P, Li W, Yan H, et al., "Self-sacrificed synthesis of carbon-coated $SiO_x$ nanowires for high capacity lithium ion battery anodes", Journal of Materials Chemistry A. 2017; 5:4183-4189.
[3] Parimalam B S, Mac Intosh A D, Kadam R, Lucht B L, "Decomposition reactions of anode solid electrolyte interphase (SEI) components with LiPF6" The Journal of Physical Chemistry C. 2017; 121:22733-22738.

2. Description of the Prior Art

Regarding batteries with highly active metals, including lithium-ion batteries, sodium-ion batteries, potassium-ion batteries, and even aluminum-ion batteries, etc., in these battery systems, metal ions used for charging and discharging come out of the cathode and enter the anode when charging, and come out of the anode and enter the cathode when discharging. The anode materials that can be used in these battery systems include graphite, hard carbons, oxides, nitrides, tin-based materials, phosphorus-based materials, silicon-based materials, lithium titanate, and $SiO_x/C$ which has been actively developed in recent years, where $0<x<2$.

As for the anode materials of these battery systems, the initial coulombic efficiency (ICE) is a performance index used to quantify the anode materials of these batteries. The initial coulombic efficiency is defined as the ratio of the discharge capacity to the charge capacity in the initial charge-discharge cycle of these batteries. Because the current coulombic efficiency of lithium-ion batteries is less than 1, that is to say, as the charge and discharge cycle proceeds, the capacities of the batteries continue to fade. Taking ICE equal to 90% as an example, 10% of the loss is actually the loss of some active metal ions. There are two main ways of the mentioned-above loss: (1) formation of solid electrolyte interface (solid electrolyte interface, SEI) film; and (2) irreversible embedded metal in anode.

In order to compensate for the irreversible capacity loss of metal-ion batteries in the initial cycle of the above battery system, for lithium-ion batteries, pre-lithiation technology has been studied to improve the reversible charging and discharging cycle capacity of lithium-ion batteries, and active lithium compensation has gained wide attention.

Pre-lithiation, also known as pre-doped lithium, describes the addition of lithium to a lithium-ion battery to replenish the lithium ions before the battery operates. On the one hand, pre-lithiation can increase the active lithium content of a lithium-ion battery during the charge/discharge cycle to obtain a higher specific capacity. On the other hand, some pre-lithiation strategies are favorable to regulate the formation of SEI film on the anode surface in advance, which is crucial to ultimately obtain the charge/discharge cycle stability of the lithium-ion battery.

Again taking lithium-ion batteries as an example to further illustrate, lithium-ion batteries have been widely commercialized as an energy storage technology with the advantages of high energy density, high discharge voltage, low internal resistance, small self-discharge, no memory effect, and environmentally friendly and non-polluting. Lithium-ion batteries have been widely used in various products, such as cell phones, notebook computers, hearing aids, cameras, and electric vehicles. In addition, lithium-ion batteries are also widely used in torpedoes, airplanes, microelectromechanical systems and other modern high-tech fields. Therefore, lithium-ion batteries are the ideal new energy source for human beings. However, the existing commercialized lithium-ion batteries still have many shortcomings, making the application of high-energy power supply cannot meet the demand. In terms of anode alone, most commercialized lithium-ion batteries use graphite and other carbon materials as the anode. This is because the anode made of graphite has the advantages of good conductivity and long cycle life. However, the graphite anode has a low specific capacity (the theoretical specific capacity of graphite is only 372 mAh/g), which is far from being able to satisfy the capacity demand of high-capacity power systems. Therefore, the development of high-capacity anode material with excellent performance has become a hot research topic.

Silicon material has higher theoretical lithium storage capacity, low de-embedded lithium potential (0.2-0.3V vs. $Li/Li^+$), and silicon is an element that is abundantly found on earth. Therefore, silicon is considered to be the most likely anode material to replace graphite. Silicon and lithium can form Li—Si alloys with various phases such as $Li1_2Si_7$, $Li_7Si_3$, $Li_{13}Si_4$, and $Li_{22}Si_5$, etc. The theoretical capacity of Li—Si alloys reaches up to 4,200 mAh/g, which is the highest among the various alloys of anode materials studied so far. Moreover, lithium embedded in silicon has a lower voltage, and there is no co-embedding of solvent molecules during the embedding process, which makes silicon very suitable for use as an anode material in lithium-ion batteries [1]. However, the large volume expansion rate (~400%) of Si anodes leads to degradation of Si particles and damage of SEI film [2-3]. These problems can cause dramatic degradation and even overall damage of the capacity, thus hindering the commercialization of silicon anode for lithium-ion batteries.

Due to lower oxygen content of $SiO_x$, $(0<x<2)$ enhanced cyclic stability, $SiO_x$ has attracted considerable research as a potential alternative to Si. $SiO_x$ not only exhibits a relatively small volume expansion rate, but also forms $Li_2O$ as well as lithium silicate, which are used as a buffer mediator for Si in the first lithiation process. As a result, $SiO_x$ exhibits better cyclic properties than Si. Hereinafter, the chemical formula of the silicon oxide particles referred to in the present invention is $SiO_x$, $0<x<2$.

For anodes made from micrometer-scale and nanometer-scale spherical particles of silicon oxide, the uniformity of the particle size of silicon oxide particles affects the characteristics of the anode. The more uniform the particle size distribution of silicon oxide particles, the better the characteristics of the anode made from silicon oxide particles. If silicon oxide particles can be produced with good uniformity of particle size distribution, the commercial value of silicon oxide particles can increase.

In order to increase the capacity and improve the initial coulombic efficiency (ICE) of lithium-ion batteries with anode made from silicon oxide particles, the silicon oxide particles need to be pre-lithiated. Prior arts have revealed the use of stabilized lithium powder for direct pre-lithiation of silicon oxide particles coated with carbon film. However, the particle size of stabilized lithium powders is usually in the range of tens of microns, while the particle size of silicon oxide particles coated with carbon film is around 5 microns. Obviously, the difference in particle size between the stabilized lithium powders and the silicon oxide particles coated with carbon film is so large that homogeneous mixing of these particles cannot be achieved. Therefore, the anodes made from the directly pre-lithiated silicon oxide particles of the prior art have poorer properties than those made from chemically pre-lithiated silicon oxide particles.

Moreover, the pH value of lithium-containing silicon oxide particles produced by direct pre-lithiation or chemical pre-lithiation in the prior arts is higher than 12. When lithium-containing silicon oxide particles are mixed with an adhesive to form an anode coating, the adhesive decomposes under high alkalinity, which significantly reduces the viscosity of the anode coating. This makes it necessary to increase the solids content to complete the coating of the anode. Also, because of the degradation of the adhesive, the anodes are formed with poor mechanical strength. Obviously, there is still space for improvement in the pre-lithiation method of the prior arts.

It should be emphasized that, in addition to lithium doping, the doping of alkali metals such as sodium and potassium into silicon oxide particles can also help to improve the cyclic performance of batteries made from silicon oxide particles and improve their initial coulombic efficiency. In addition to lithium-ion batteries, for sodium-ion batteries, potassium-ion batteries, and even aluminum-ion batteries, various anode materials also require pre-lithium, pre-sodiation, and pre-potassiation to improve the initial coulombic efficiency.

SUMMARY OF THE INVENTION

Accordingly, one scope of the invention is to provide a method of manufacturing a plurality of passivated and homogenized alkali metal-containing anode material particles, which serves as an anode active material. These anode active materials can be widely used as anode materials in lithium-ion batteries, sodium-ion batteries, potassium-ion batteries, and even aluminum-ion batteries.

A method of manufacturing an anode active material, according to a preferred embodiment of the invention, is, firstly, to prepare a plurality of anode material particle. Next, the method according to the preferred embodiment of the invention is to place the plurality of anode material particles and an alkali metal source in a reaction chamber for continuous mixing, and to heat the anode material particles mixed with the alkali metal source in an inert furnace atmosphere to a reaction temperature higher than a melting point of the alkali metal source to obtain a plurality of alkali metal-containing anode material particles. The alkali metal source can be a lithium, a sodium, a potassium or a mixture therebetween. Then, the method according to the preferred embodiment of the invention is, in the inert furnace atmosphere, to heat the plurality of alkali metal-containing anode material particles to a first temperature for a first period of time to homogenize the plurality of alkali metal-containing anode material particles. The first temperature ranges from 500° C. to 800° C. The first period of time ranges from 1 hour to 24 hours. Finally, the method according to the preferred embodiment of the invention is, in a fluorine-containing furnace atmosphere, to heat the homogenized alkali metal-containing anode material particles to a second temperature for a second period of time to passivate the homogenized alkali metal-containing anode material particles.

The fluorine-containing furnace atmosphere can be a fluorine nitride such as nitrogen trifluoride or a fluorocarbon such as chlorofluorocarbon (Freon). The second temperature ranges from 140° C. to 300° C. The second period of time ranges from 30 minutes to 24 hours. The passivated and homogenized alkali metal-containing anode material particles serves as the anode active material.

In one embodiment, the plurality of anode material particles can include a $SiO_x/C$ particle, a graphite particle, a hard carbon particle, a soft carbon particles, a mesocarbon microbead particle, a surface-modified graphite particle, a carbon-coated graphite particle, an oxide particle, a nitride particle, a tin-based material particle, a phosphorus-based material particle, a silicon-based material particle, a lithium titanate particle and a mixture therebetween, where the $SiO_x/C$ particle is a silicon oxide particle coated with a carbon film, $0<x<2$.

In one embodiment, the pH value of the anode active material is equal to or less than 12.

In one embodiment, in the step of homogenizing the plurality of alkali metal-containing anode material particles, a phosphorus or a boron is added to generate a phosphorus oxide or a boron oxide on a surface of one of the alkali metal-containing anode material particles, and further to reduce the pH value of the anode active material. A weight ratio of an amount of the phosphorus or boron added to the plurality of alkali metal-containing anode material particles is equal to or less than 10%.

Different from the direct pre-lithiation method of the prior art, the method according to the invention continuously is to mix the anode material particles with molten alkali metal to uniformly and efficiently dope the alkali metal into the anode material particles. Moreover, the plurality of passivated and homogenized alkali metal-containing anode material particles, made by the method according to the invention, has a pH value equal to or less than 12, which makes the anode material particles easy to produce an anode of a battery.

The advantage and spirit of the invention may be understood by the following recitations together with the appended drawings.

BRIEF DESCRIPTION OF THE APPENDED DRAWINGS

DETAILED DESCRIPTION OF THE INVENTION

Some preferred embodiments and practical applications of this present invention would be explained in the following paragraph, describing the characteristics, spirit, and advantages of the invention.

Figure 1:
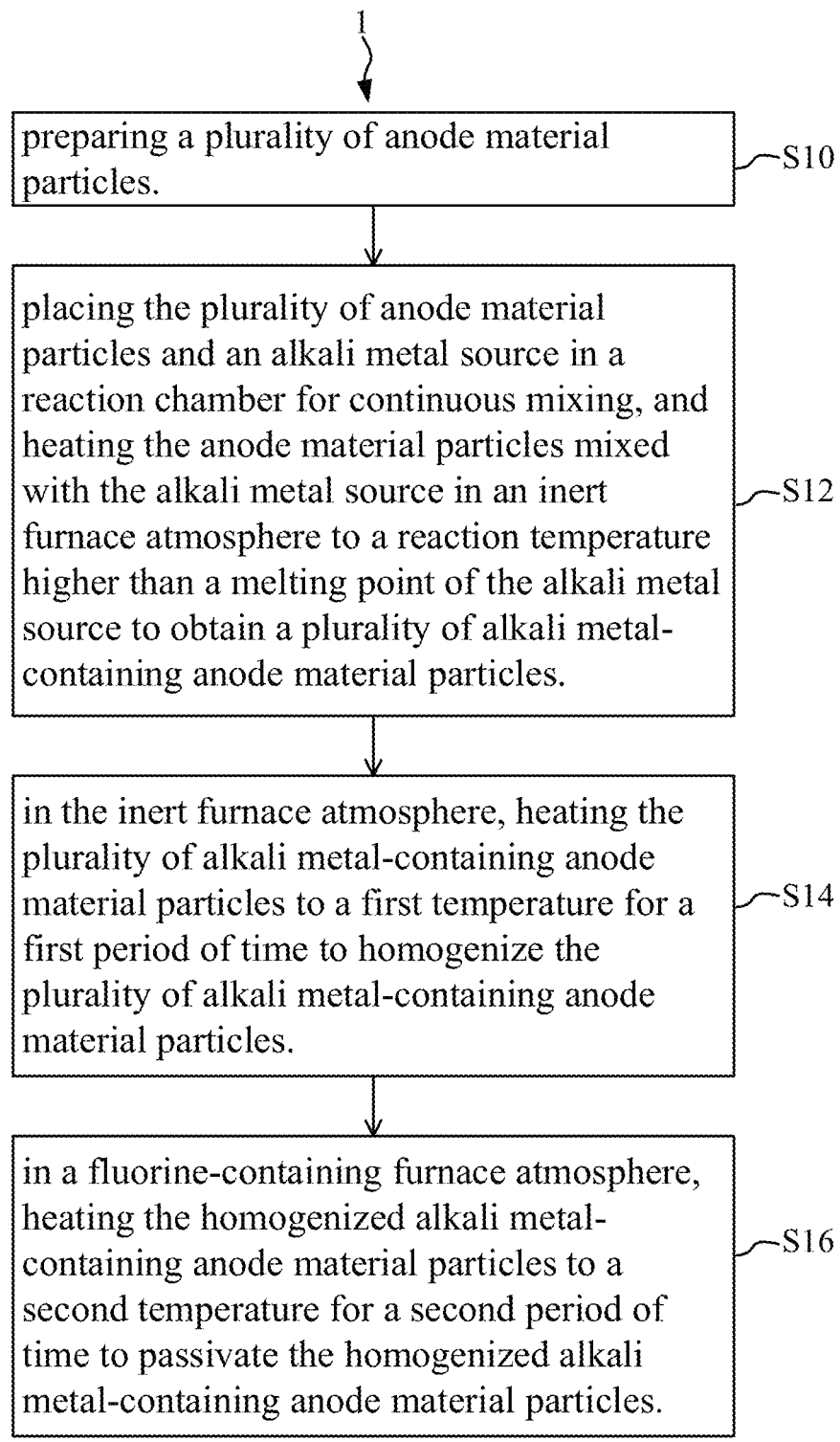
FIG. 1 is a flowchart illustrating a method of manufacturing an anode active material according to the preferred embodiment of the invention.

Referring to FIG. 1, FIG. 1 is a flowchart illustrating a method 1 of manufacturing an anode active material according to the preferred embodiment of the invention.

As shown in FIG. 1, the method 1 according to the preferred embodiment of the invention, firstly, performs step S10 to prepare a plurality of anode material particles. In one embodiment, the plurality of anode material particles can include a $SiO_x/C$ particle, a graphite particle, a hard carbon particle, a soft carbon particles, a mesocarbon microbead particle, a surface-modified graphite particle, a carbon-coated graphite particle, an oxide particle, a nitride particle, a tin-based material particle, a phosphorus-based material particle, a silicon-based material particle, a lithium titanate particle and a mixture therebetween, where the $SiO_x/C$ particle is a silicon oxide particle coated with a carbon film, $0<x<2$. Many methods have been proposed for the preparation of the mentioned-above anode material particles, and will be not described in detail herein.

Next, the method 1 according to the preferred embodiment of the invention performs step S12 to place the plurality of anode material particles and an alkali metal source in a reaction chamber for continuous mixing, and to heat the anode material particles mixed with the alkali metal source in an inert furnace atmosphere to a reaction temperature higher than a melting point of the alkali metal source to obtain a plurality of alkali metal-containing anode material particles. The alkali metal source can be a lithium, a sodium, a potassium or a mixture therebetween. In practical applications, the plurality of silicon oxide particles coated with a carbon film can, to a certain extent, prevent the degradation of electrical conductivity caused by alkali metal doping.

Then, the method 1 according to the preferred embodiment of the invention performs step S14, in the inert furnace atmosphere, to heat the plurality of alkali metal-containing anode material particles to a first temperature for a first period of time to homogenize the plurality of alkali metal-containing anode material particles. The first temperature ranges from 500° C. to 800° C. The first period of time ranges from 1 hour to 24 hours.

Finally, the method 1 according to the preferred embodiment of the invention performs step S16, in a fluorine-containing furnace atmosphere, to heat the homogenized alkali metal-containing anode material particles to a second temperature for a second period of time to passivate the homogenized alkali metal-containing anode material particles. The passivated and homogenized alkali metal-containing anode material particles serves as the anode active material.

The fluorine-containing furnace atmosphere can be a fluorine nitride such as nitrogen trifluoride or a fluorocarbon such as chlorofluorocarbon (Freon). The second temperature ranges from 140° C. to 300° C. The second period of time ranges from 30 minutes to 24 hours.

In one embodiment, the pH value of the anode active material is equal to or less than 12. The anode active material having a pH value equal to or less than 12 manufactured by the method 1 according to the invention can be easily mixed with an adhesive to form an anode coating, which has a high viscosity and can be coated without increasing the solids content, and thus can be easily formed into an anode. The proportion of adhesive ranges from 5 to 15 wt. %.

In one embodiment, in the method 1 according to the preferred embodiment of the invention, in the step of homogenizing the plurality of alkali metal-containing anode material particles, a phosphorus or a boron is added to generate a phosphorus oxide or a boron oxide on a surface of one of the alkali metal-containing anode material particles, and further to reduce the pH value of the anode active material. A weight ratio of an amount of the phosphorus or boron added to the plurality of alkali metal-containing anode material particles is equal to or less than 10%.

In the example of the invention, silicon oxide particles coated with a carbon film are doped with 3 wt. %, 6 wt. %, and 9 wt. % of sodium, respectively, and are subjected to homogenization and passivation according to the method of the invention. The pH value of the silicon oxide particles coated with the carbon film and doped with 3 wt. % and 6 wt. % of sodium, homogenized and passivated as described above is measured to be in the range of 10-11. And, the pH value of the silicon oxide particles coated with the carbon film and doped with 9 wt. % of sodium, homogenized and passivated as described above is measured to be in the range of 11-12. By way of comparison, silicon oxide particles coated with the carbon film that are not doped with sodium, homogenized and passivated are also prepared. The example of the present invention is doped with sodium, homogenized and passivated.

The sodium-doped, homogenized and passivated silicon oxide particles coated with the carbon film of the example of the invention are mixed with an adhesive to form a first anode coating. The silicon oxide particles coated with the carbon film of the comparative example are also mixed with an adhesive to form a second anode coating. The coating effect of the first anode coating is similar to that of the second anode coating.

Figure 2:
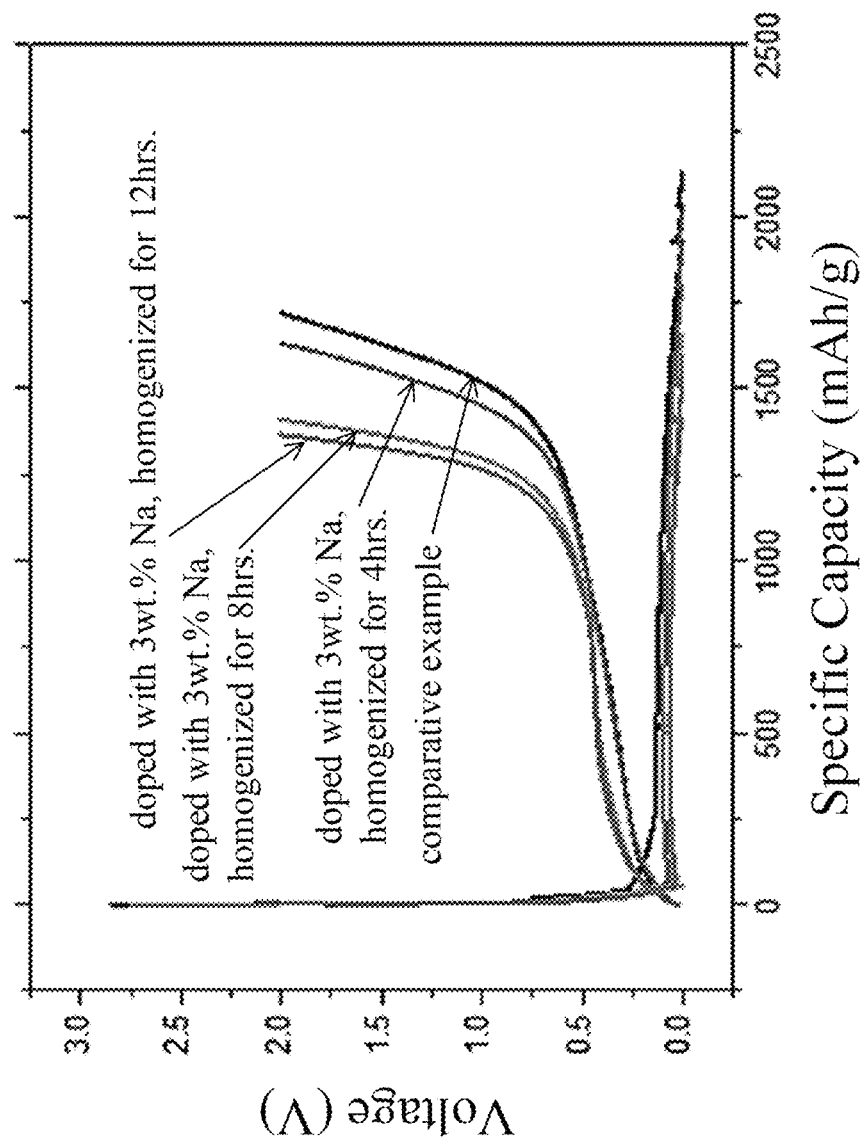
FIG. 2 is a diagram showing the charging and discharging voltage curves of an anode of a battery made from homogenized and passivated silicon oxide particles coated with a carbon film and doped with 3 wt. % of sodium in an example of the invention for different homogenization times.
Figure 3:
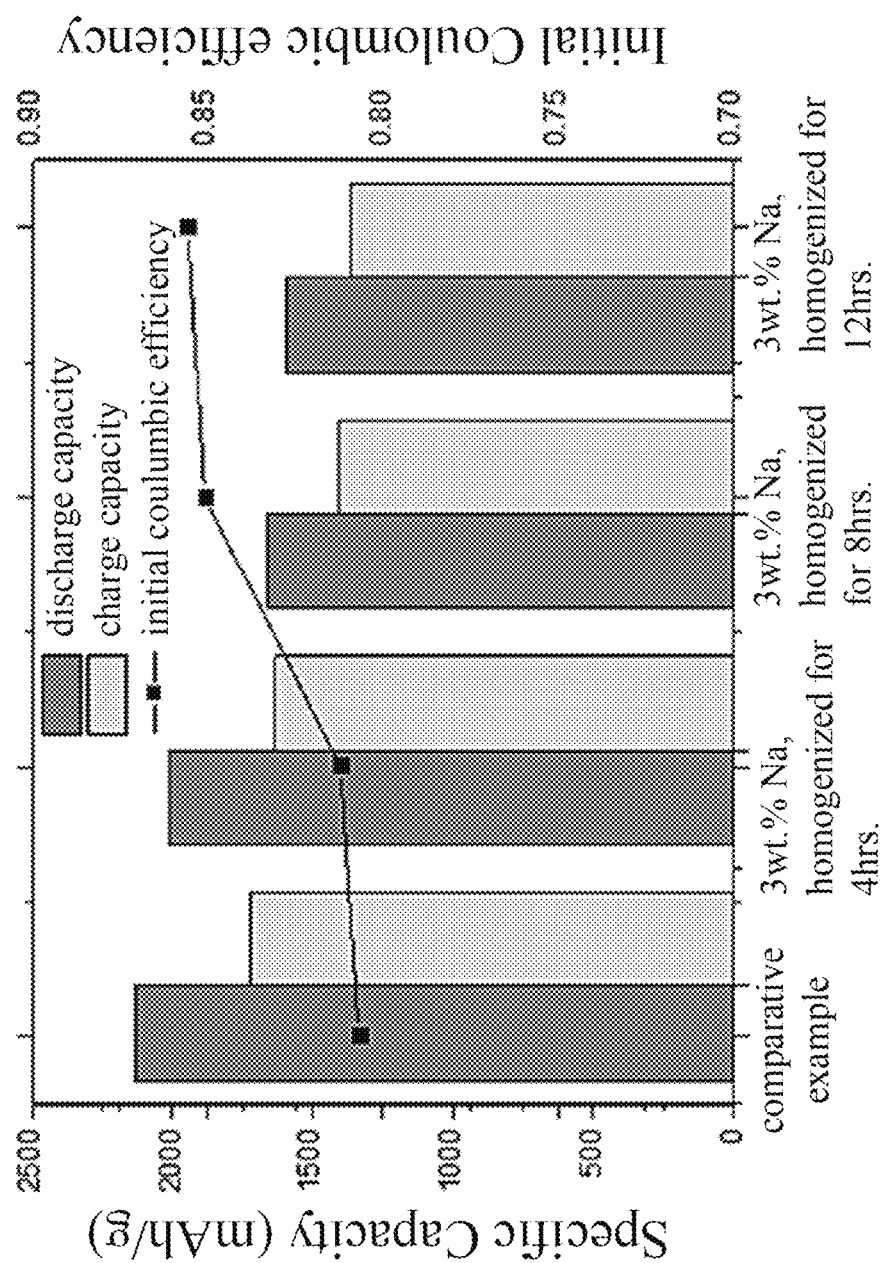
FIG. 3 is a diagram showing the specific capacity and initial coulombic efficiency curves of an anode of a battery made from homogenized and passivated silicon oxide particles coated with a carbon film and doped with 3 wt. % of sodium in an example of the invention for different homogenization times.

Referring to FIGS. 2 and 3. The homogenized and passivated silicon oxide particles coated with a carbon film and doped with 3 wt. % of sodium in an example of the invention are made to form an anode of a battery, where the silicon oxide particles coated with the carbon film are homogenized at a homogenization temperature of 750° C. for 4 hours, 8 hours and 12 hours, respectively. The charging/discharging voltage curves of these anodes are shown in FIG. 2. The measured specific capacity and initial coulombic efficiency curves of these anodes are shown in FIG. 3. For comparison, the silicon oxide particles coated with the carbon film of the comparative example are also manufactured as an anode of a battery, the charge/discharge voltage curves of the anode are also shown in FIG. 2, and the measured specific capacity and initial coulombic efficiency curves of the anode are also shown in FIG. 3.

The results in FIGS. 2 and 3 show that compared with the comparative example, the initial coulombic efficiency of the 3 wt. % sodium-doped example increases with the longer homogenization time, and is higher than the initial coulombic efficiency of the comparative example, but the charging and discharging capacity of the 3 wt. % sodium-doped example decreases slightly.

Figure 4:
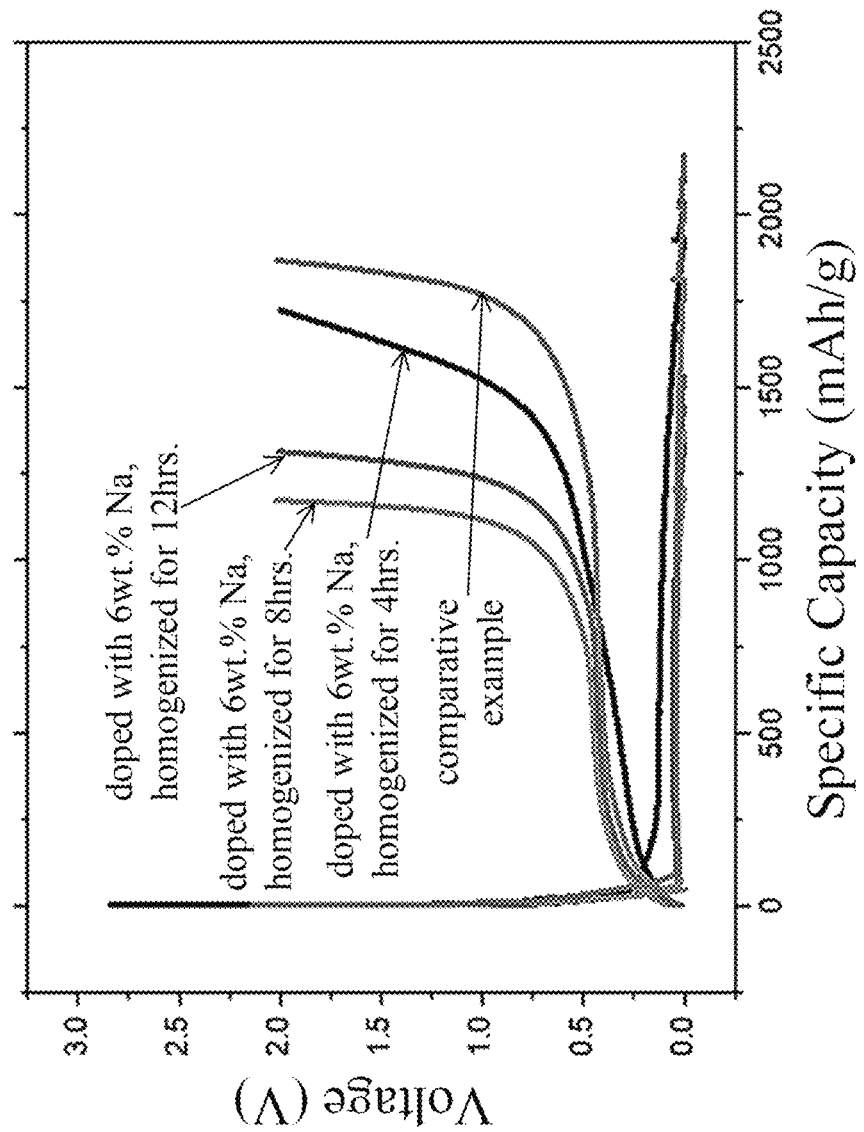
FIG. 4 is a diagram showing the charging and discharging voltage curves of an anode of a battery made from homogenized and passivated silicon oxide particles coated with a carbon film and doped with 6 wt. % of sodium in an example of the invention for different homogenization times.
Figure 5:
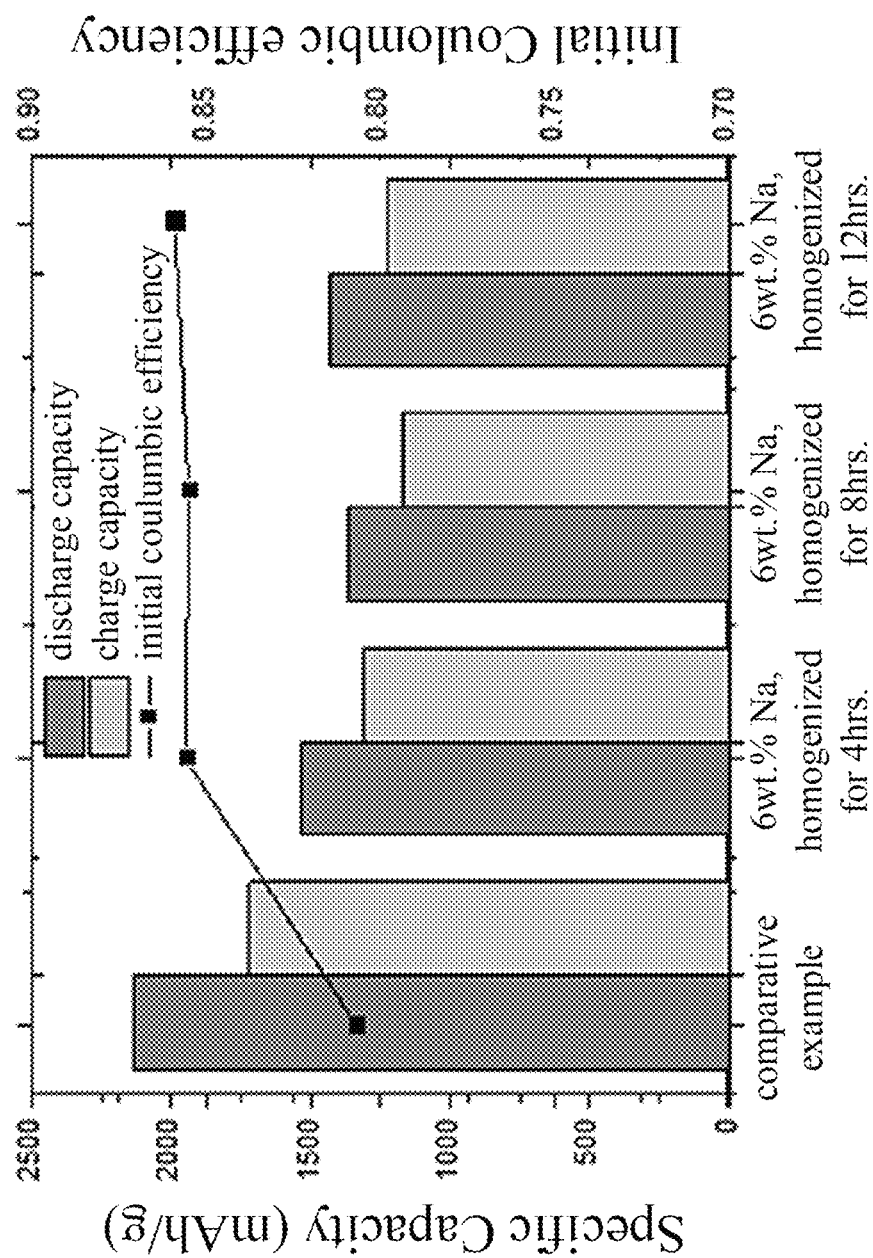
FIG. 5 is a diagram showing the specific capacity and initial coulombic efficiency curves of an anode of a battery made from homogenized and passivated silicon oxide particles coated with a carbon film and doped with 6 wt. % of sodium in an example of the invention for different homogenization times.

Referring to FIGS. 4 and 5. The homogenized and passivated silicon oxide particles coated with a carbon film and doped with 6 wt. % of sodium in an example of the invention are made to form an anode of a battery, where the silicon oxide particles coated with the carbon film are homogenized at a homogenization temperature of 750° C. for 4 hours, 8 hours and 12 hours, respectively. The charging/discharging voltage curves of these anodes are shown in FIG. 4. The measured specific capacity and initial coulombic efficiency curves of these anodes are shown in FIG. 5. For comparison, the silicon oxide particles coated with the carbon film of the comparative example are also manufactured as an anode of a battery, the charging/discharging voltage curves of the anode are also shown in FIG. 4, and the measured specific capacity and initial coulombic efficiency curves of the anode are also shown in FIG. 5.

The results in FIGS. 4 and 5 show that compared with the comparative example, the initial coulombic efficiencies of the example doped with 6 wt. % sodium are similar for the three different homogenization times, and all of them are higher than the initial coulombic efficiency of the comparative example. And, the example with a homogenization time of 4 hours has the highest reversible capacity.

Figure 6:
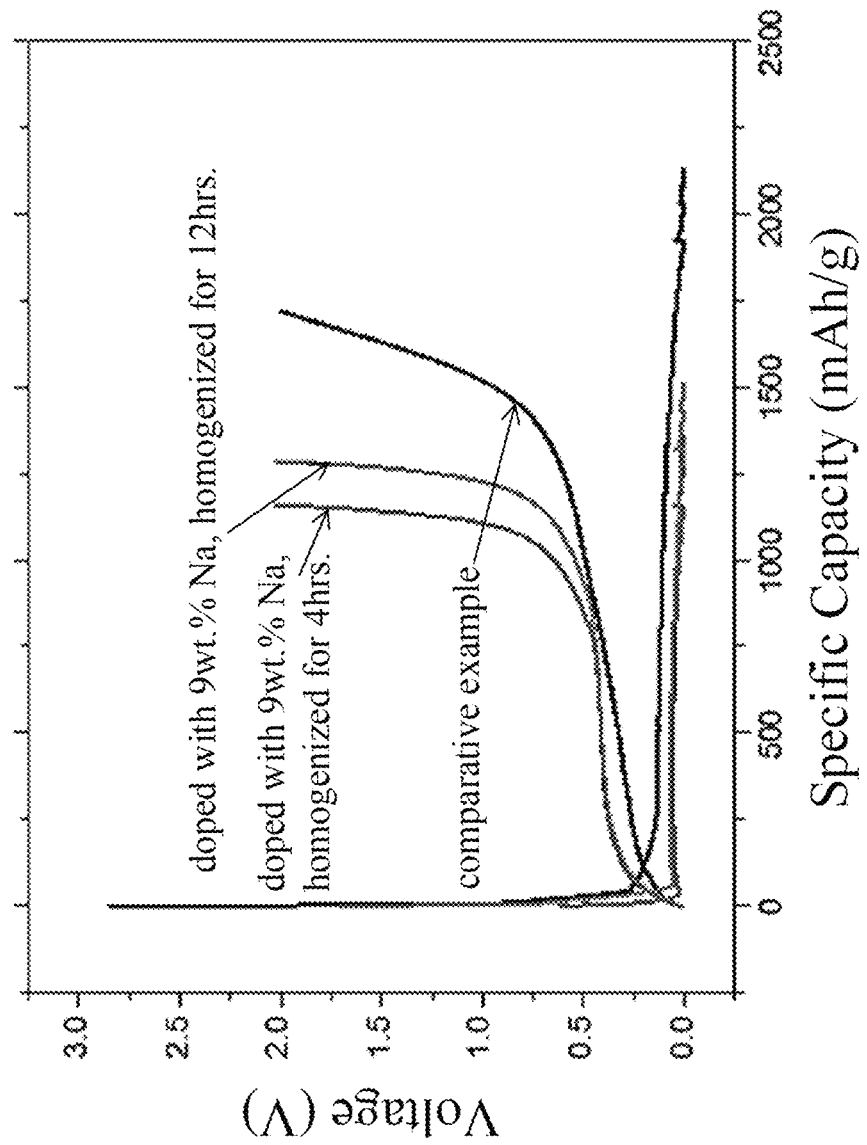
FIG. 6 is a diagram showing the charging and discharging voltage curves of an anode of a battery made from homogenized and passivated silicon oxide particles coated with a carbon film and doped with 9 wt. % of sodium in an example of the invention for different homogenization times.
Figure 7:
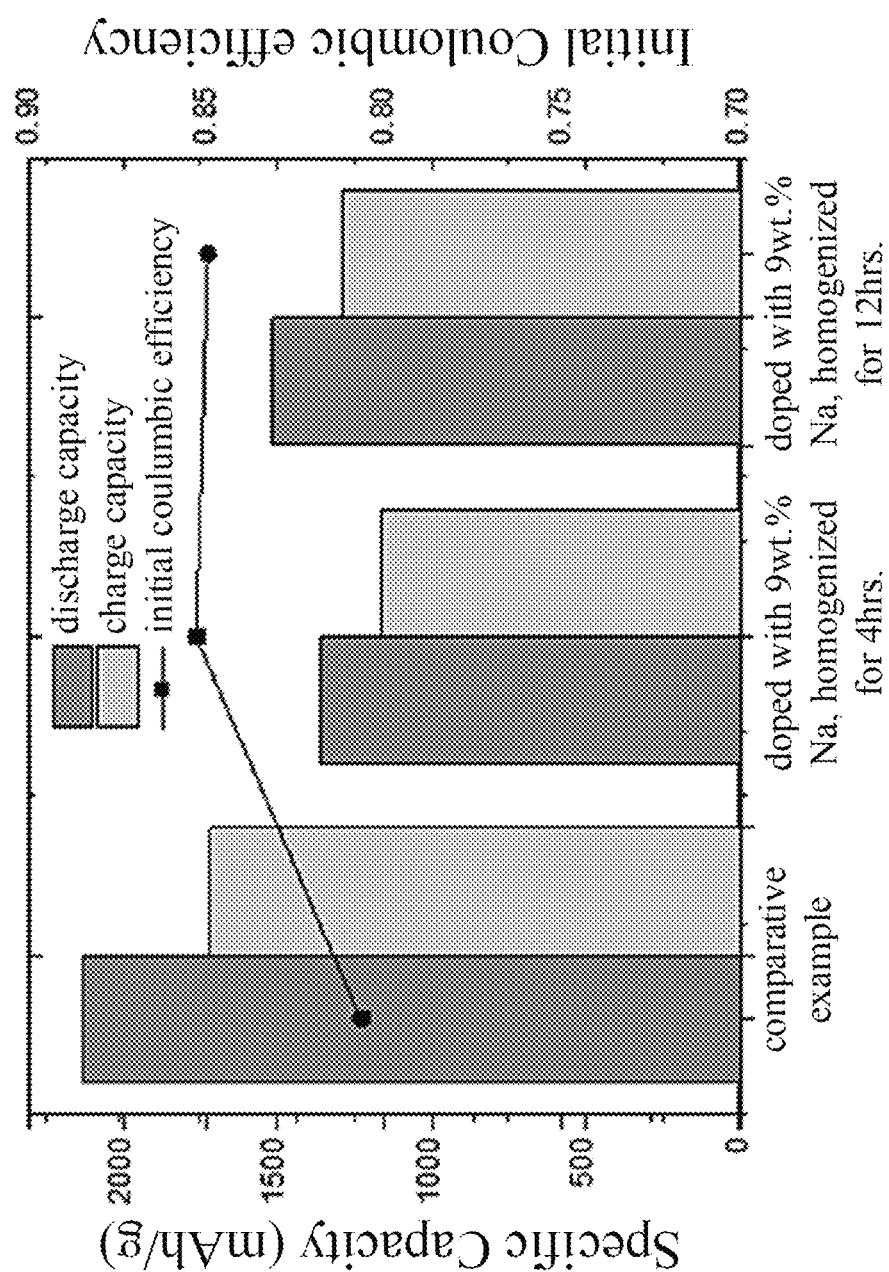
FIG. 7 is a diagram showing the specific capacity and initial coulombic efficiency curves of an anode of a battery made from homogenized and passivated silicon oxide particles coated with a carbon film and doped with 9 wt. % of sodium in an example of the invention for different homogenization times.

Referring to FIGS. 6 and 7. The homogenized and passivated silicon oxide particles coated with a carbon film and doped with 9 wt. % of sodium in an example of the invention are made to form an anode of a battery, where the silicon oxide particles coated with the carbon film are homogenized at a homogenization temperature of 750° C. for 4 hours and 12 hours, respectively. The charging/discharging voltage curves of these anodes are shown in FIG. 6. The measured specific capacity and initial coulombic efficiency curves of these anodes are shown in FIG. 7. For comparison, the silicon oxide particles coated with the carbon film of the comparative example are also manufactured as an anode of a battery, the charging/discharging voltage curves of the anode are also shown in FIG. 6, and the measured specific capacity and initial coulombic efficiency curves of the anode are also shown in FIG. 7.

The results in FIGS. 6 and 7 show that compared with the comparative example, the initial coulombic efficiencies of the example doped with 9 wt. % sodium are similar for two different homogenization times, and are higher than the initial coulombic efficiency of the comparative example. And, the highest reversible capacity is obtained for the example homogenized for 12 hours.

Figure 8:
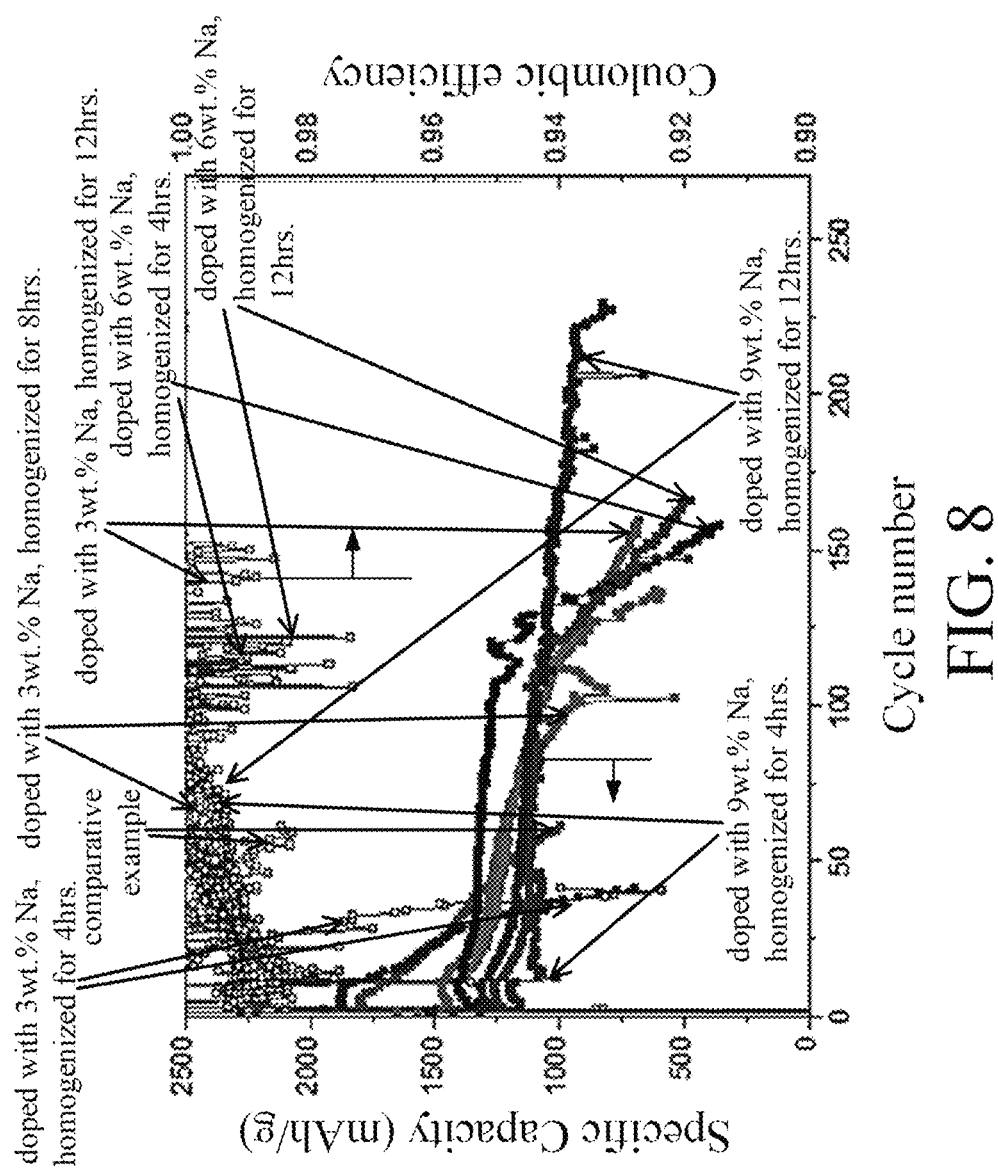
FIG. 8 is a diagram showing the specific capacity and coulombic efficiency curves measured with the number of charging and discharging cycles at an anode of a battery made from various sodium doping amounts and homogenization times in the examples of the invention.

In examples of the invention, the silicon oxide particles coated with the carbon film, doped with 3 wt. % sodium and homogenized for 4, 8, and 12 hours respectively are used to make the anode of the battery. The silicon oxide particles coated with the carbon film, doped with 6 wt. % sodium and homogenized for 4 and 12 hours respectively are used to make the anode of the battery. The silicon oxide particles coated with the carbon film, doped with 9 wt. % sodium and homogenized for 4 and 12 hours respectively are used to make the anode of the battery. As well as, the silicon oxide particles coated with the carbon film of the comparative example are also used to make the anode of the battery. The specific capacity and coulombic efficiency curves measured with the number of charging and discharging cycles for these anodes made by the examples of the invention and the comparative example are shown in FIG. 8.

TABLE 1

| property condition | pH | 1st DSC (mAh/g) | ICE | $C_{res}$ at 50 cycles | $C_{res}$ at 100 cycles | $C_{res}$ at 150 cycles | $C_{res}$ at 200 cycles |
|---|---|---|---|---|---|---|---|
| comparative example | 9.70 | 2220 | 80.0% | 64.9% | — | — | — |
| 3 wt. % Na, homogenized for 4 hrs. | 10.67 | 2009 | 81.2% | — | — | — | — |
| 3 wt. % Na, homogenized for 8 hrs. | 10.75 | 1657 | 85.1% | 85.5% | 63.9% | — | — |
| 3 wt. % Na, homogenized for 12 hrs. | 11.16 | 1596 | 85.6% | 87.5% | 76.4% | 52.9% | — |
| 6 wt. % Na, homogenized for 4 hrs. | 11.05 | 1532 | 85.6% | 97.1% | 93.9% | 38.7% | — |

TABLE 1-continued

| property condition | pH | 1st DSC (mAh/g) | ICE | $C_{res}$ at 50 cycles | $C_{res}$ at 100 cycles | $C_{res}$ at 150 cycles | $C_{res}$ at 200 cycles |
|---|---|---|---|---|---|---|---|
| 6 wt. % Na, homogenized for 12 hrs. | 11.00 | 1429 | 85.9% | 89.5% | 89.2% | 53.3% | — |
| 9 wt. % Na, homogenized for 4 hrs. | 11.61 | 1358 | 85.3% | — | — | — | — |
| 9 wt. % Na, homogenized for 12 hrs | 11.78 | 1513 | 85.0% | 88.5% | 84.8% | 80.1% | 73.7% |

The residual capacity ($C_{res}$) at different cycle numbers, the discharging specific capacity for the first charging/discharging cycle (1st DSC) and the initial coulombic efficiency (ICE) of these anodes made by the examples of the invention and the comparative example are obtained by the specific capacity and coulombic efficiency curves in FIG. 8, and are listed in Table 1. The pH values of these alkali metal-containing anode material particles of the examples of the invention and the silicon oxide particles coated with the carbon film of the comparative example, used to make these anodes, are also listed in Table 1.

The results in FIG. 8 and Table 1 show that the anodes of the battery made from the homogenized and passivated silicon oxide particles coated with the carbon film and doped with alkali metals of the examples of the invention have excellent initial coulombic efficiency and residual capacity after many charging and discharging cycles.

Figure 9:
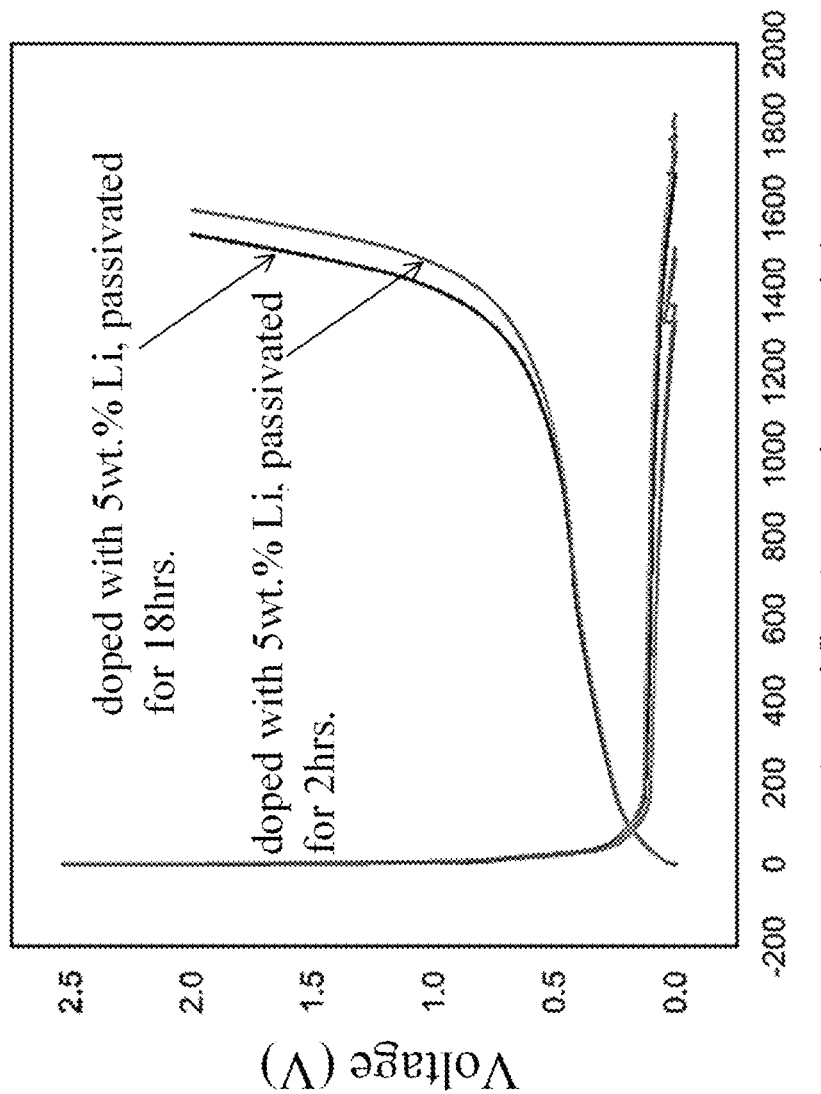
FIG. 9 is a diagram showing the charging and discharging voltage curves of an anode of a battery made from homogenized and passivated silicon oxide particles coated with a carbon film and doped with 5 wt. % of lithium in another example of the invention for different homogenization times.

Referring to FIG. 9. In another example of the invention, the silicon oxide particles coated with the carbon film are doped with 5 wt. % lithium, homogenized and passivated in an $NF_3$ furnace atmosphere at a passivation temperature of 160° C. for 18 hours and 2 hours, respectively, and are used to make the anode of the battery.

The charge/discharge voltage curves of these anodes are shown in FIG. 9. The results in FIG. 9 show that compared to the data of the comparative examples in FIGS. 2 and 3, the initial coulomb efficiencies of the examples doped with 5 wt. % lithium with passivation time variations are not very different, and they are all higher than the initial coulombic efficiencies of the comparative examples. But the charging and discharging capacities of the examples doped with 5 wt. % lithium are slightly lower.

The above two kinds of silicon oxide particles are used to make the anodes of the battery. In another examples of the invention, the silicon oxide particles with the carbon film are doped with 5 wt. % lithium and 6 wt. % sodium, homogenized and passivated in a $NF_3$ furnace atmosphere for 2 hours, and are also used to make the anodes of the battery. In another examples of the invention, the silicon oxide particles with the carbon film are doped with 5 wt. % lithium and 3 wt. % phosphorus, homogenized and passivated in a $NF_3$ furnace atmosphere for 2 hours, and are also used to make the anode of the battery.

The discharging specific capacity for the first charging/discharging cycle (1st DSC), the charging specific capacity for the first charging/discharging cycle (1st CSC), the initial coulombic efficiency (ICE) of these anodes of the battery are measured and listed in Table 2. The pH values of these alkali metal-containing anode material particles of another examples of the invention, used to make these anodes, are also listed in Table 2.

TABLE 2

| property condition | pH | 1st DSC (mAh/g) | 1st CSC (mAh/g) | ICE |
|---|---|---|---|---|
| 5 wt. % Li, passivated for 18 hrs. | 11.11 | 1779.94 | 1536.76 | 86.34% |
| 5 wt. % Li, passivated for 2 hrs. | 11.78 | 1829.74 | 1596.44 | 87.25% |
| 5 wt. % Li (+3 wt. % P), passivated for 2 hrs. | 11.30 | 1616.87 | 1417.80 | 87.69% |
| 5 wt. % Li (+6 wt. % Na), passivated for 2 hrs | 11.77 | 1549.72 | 1332.25 | 85.97% |

The results in Table 2 confirm once again that the anodes of the battery made from the homogenized and passivated silicon oxide particles coated with the carbon film and doped with alkali metals or various alkali metals, even silicon oxide particles further doped with phosphorus or boron, of another examples of the invention have excellent initial coulombic efficiency.

Figure 10:
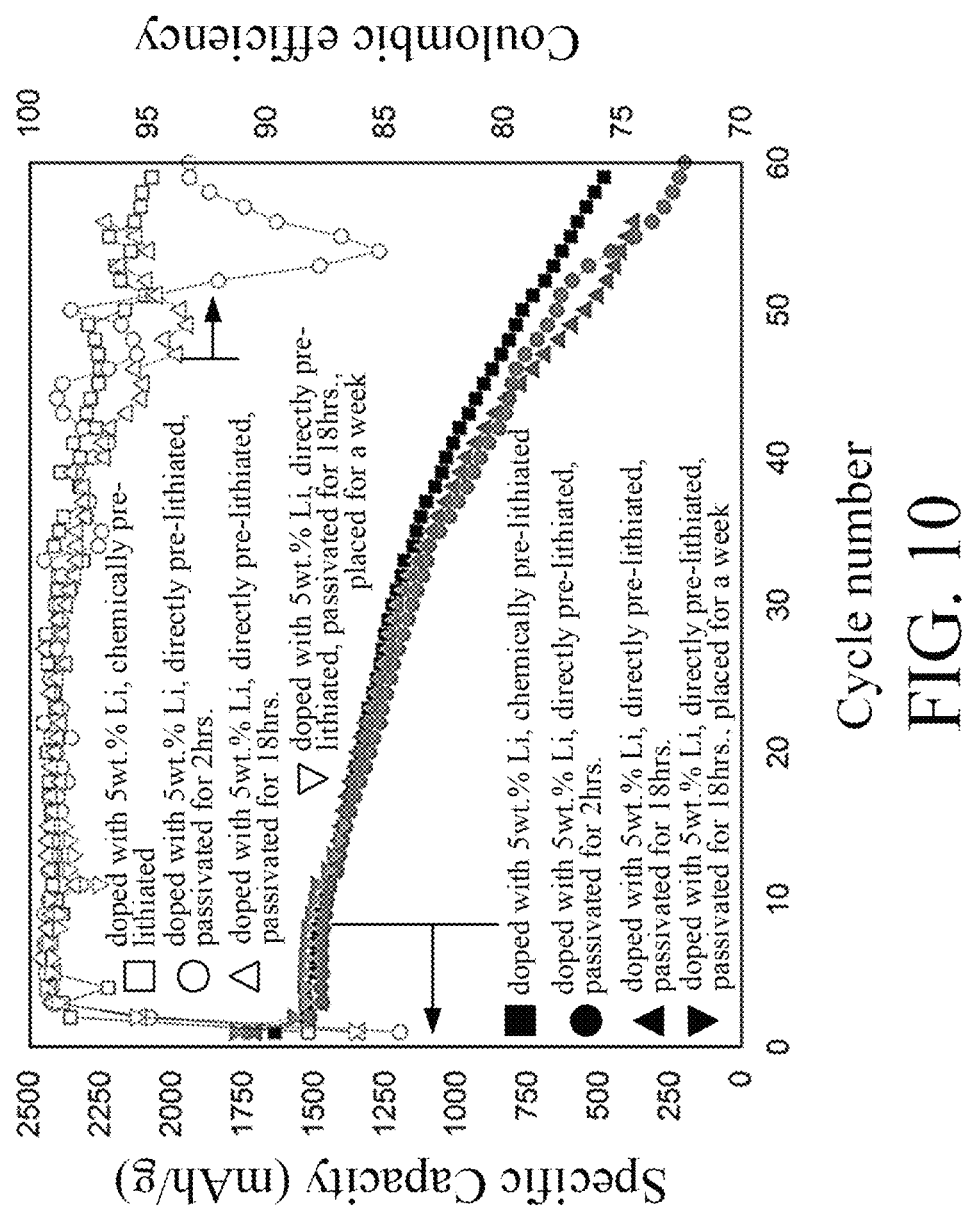
FIG. 10 is a diagram showing the specific capacity and coulombic efficiency curves measured with the number of charging and discharging cycles at an anode of a battery made from various lithium doping amounts and homogenization times in the examples of the invention.

Referring to FIG. 10. In another examples of the invention, the silicon oxide particles coated with the carbon film are directly doped with 5 wt. % lithium, homogenized and passivated for 18 hours and 2 hours, and are used to make the anodes of the battery. In another examples of the invention, the silicon oxide particles coated with the carbon film are directly doped with 5 wt. % lithium, homogenized and passivated for 18 hours, even placed for one week, and are used to make the anode of the battery. For comparison, the silicon oxide particles coated with the carbon film are chemically doped with 5 wt. % lithium by using a pre-lithiation solution containing biphenyl, and are used to make the anode of the battery. The specific capacity and coulombic efficiency curves measured with the number of charging and discharging cycles for these anodes of the another examples of the invention and the comparative example are shown in FIG. 10. The results in FIG. 10 show that, different from the direct pre-lithiation method of the prior art, the specific capacities and coulombic efficiencies measured with the number of charging and discharging cycles of the anodes of the battery made from the silicon oxide particles coated with carbon films directly doped with alkali metals under the above process conditions of the invention are basically not much different from that of the chemical pre-lithiation of the comparative example. It should be emphasized that the anodes made from the silicon oxide particles doped with lithium by direct pre-lithiation method of the prior art have poorer properties than those of the anodes made from the silicon oxide particles doped with lithium by chemical pre-lithiation method.

With the detailed description of the above preferred embodiments of the invention, it is clear to understand that the method according to the invention is to continuously mix the anode material particles with molten alkali metal to uniformly and efficiently dope the alkali metal into the anode material particles. Moreover, the plurality of passivated and homogenized alkali metal-containing anode material particles, made by the method according to the invention, has a pH value equal to or less than 12, which makes the anode material particles easy to produce an anode of a battery. These anode active materials can be widely used as anode materials in lithium-ion batteries, sodium-ion batteries, potassium-ion batteries, and even aluminum-ion batteries. Further, the anodes made from the anode active material manufactured according to the method of the invention have excellent charging and discharging specific capacities and coulombic efficiencies. These negative electrode active materials include various negative electrode active materials used in lithium ion batteries, sodium ion batteries, potassium ion batteries, and even aluminum ion batteries. The anodes of the battery, made from these anode active materials manufactured by the method according to the invention, can obtain good initial coulombic efficiency.

With the detailed description of the above preferred embodiments of the invention, it is clear to understand that the method according to the invention can manufacture a plurality of silicon nano-powders with easy shape control, high purity and mass production. The manufacturing equipment according to the invention is beneficial to the mass production of a plurality of silicon nano-powders with high purity.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A method of manufacturing an anode active material, comprising the steps of:
   preparing a plurality of anode material particles;
   placing the plurality of anode material particles and an alkali metal source in a reaction chamber for continuous mixing, and heating the anode material particles mixed with the alkali metal source in an inert furnace atmosphere to a reaction temperature higher than a melting point of the alkali metal source to obtain a plurality of alkali metal-containing anode material particles, wherein the alkali metal source is one selected from the group consisting of a lithium, a sodium, a potassium and a mixture therebetween;
   in the inert furnace atmosphere, heating the plurality of alkali metal-containing anode material particles to a first temperature for a first period of time to homogenize the plurality of alkali metal-containing anode material particles, wherein the first temperature ranges from 500° C. to 800° C., and the first period of time ranges from 1 hour to 24 hours; and
   in a fluorine-containing furnace atmosphere, heating the homogenized alkali metal-containing anode material particles to a second temperature for a second period of time to passivate the homogenized alkali metal-containing anode material particles, wherein the fluorine-containing furnace atmosphere is a nitrogen trifluoride or a chlorofluorocarbon, the second temperature ranges from 140° C. to 300° C., and the second period of time ranges from 30 minutes to 24 hours,
   wherein the passivated and homogenized alkali metal-containing anode material particles serves as the anode active material.

2. The method of claim 1, wherein the plurality of anode material particles comprise one selected from the group consisting of a $SiO_x$/C particle, a graphite particle, a hard carbon particle, a soft carbon particles, a mesocarbon microbead particle, a surface-modified graphite particle, a carbon-coated graphite particle, an oxide particle, a nitride particle, a tin-based material particle, a phosphorus-based material particle, a silicon-based material particle, a lithium titanate particle and a mixture therebetween, 0<x<2.

3. The method of claim 1, wherein a pH value of the anode active material is equal to or less than 12.

4. The method of claim 1, wherein in the step of homogenizing the plurality of alkali metal-containing anode material particles, a phosphorus or a boron is added to generate a phosphorus oxide or a boron oxide on a surface of one of the alkali metal-containing anode material particles, and further to reduce the pH value of the anode active material, a weight ratio of an amount of the phosphorus or the boron added to the plurality of alkali metal-containing anode material particles is equal to or less than 10%.

\* \* \* \* \*